(12) United States Patent
Kawai et al.

(10) Patent No.: US 11,520,302 B2
(45) Date of Patent: Dec. 6, 2022

(54) CONTROL SYSTEM AND CONTROL DEVICE

(71) Applicant: OMRON Corporation, Kyoto (JP)

(72) Inventors: Ko Kawai, Kusatsu (JP); Takahiro Toku, Kusatsu (JP)

(73) Assignee: OMRON Corporation, Kyoto (JP)

(*) Notice: Subject to any disclaimer, the term of this patent is extended or adjusted under 35 U.S.C. 154(b) by 40 days.

(21) Appl. No.: 17/284,781

(22) PCT Filed: Oct. 24, 2019

(86) PCT No.: PCT/JP2019/041734
§ 371 (c)(1),
(2) Date: Apr. 12, 2021

(87) PCT Pub. No.: WO2020/100548
PCT Pub. Date: May 22, 2020

(65) Prior Publication Data
US 2022/0004155 A1    Jan. 6, 2022

(30) Foreign Application Priority Data

Nov. 15, 2018 (JP) .............................. JP2018-214286

(51) Int. Cl.
*G05B 15/02* (2006.01)
*G06F 7/57* (2006.01)

(52) U.S. Cl.
CPC ............... *G05B 15/02* (2013.01); *G06F 7/57* (2013.01)

(58) Field of Classification Search
CPC ....... G05B 15/02; G05B 19/0421; G06F 7/57; G06F 2209/5012; G06F 9/5027
See application file for complete search history.

(56) References Cited

U.S. PATENT DOCUMENTS

2007/0058929 A1* 3/2007 Chaffee .............. G05B 19/4141
386/316
2011/0263309 A1* 10/2011 Gowin ................ G07F 17/3225
463/16

FOREIGN PATENT DOCUMENTS

EP          2595020       5/2013
JP        2002351509     12/2002
(Continued)

OTHER PUBLICATIONS

"International Search Report (Form PCT/ISA/210) of PCT/JP2019/041734," dated Dec. 24, 2019, with English translation thereof, pp. 1-4.

(Continued)

*Primary Examiner* — Michael W Choi
(74) *Attorney, Agent, or Firm* — JCIPRNET

(57) ABSTRACT

This control system includes: a first arithmetic unit for doing cyclic execution of a first task to which one or a plurality of processes are allocated using a first control cycle; and a second arithmetic unit for doing cyclic execution of a second task to which one or a plurality of processes are allocated using a second control cycle that is longer than the first control cycle. For the first task, a first data collection process with a first input data as the target and a corresponding first data processing process are allocated. Depending on the setting via the support device, a second data collection process with a second input data as the target and a corresponding second data processing process are allocated to either of the first task and the second task.

11 Claims, 14 Drawing Sheets

(56) References Cited

FOREIGN PATENT DOCUMENTS

| | | |
|---|---|---|
| JP | 4752983 | 8/2011 |
| JP | 2015210728 | 11/2015 |
| WO | 2018147058 | 8/2018 |
| WO | 2018186358 | 10/2018 |
| WO | WO-2020121840 A1 * | 6/2020 |

OTHER PUBLICATIONS

"Written Opinion of the International Searching Authority (Form PCT/ISA/237) of PCT/JP2019/041734," dated Dec. 24, 2019, with English translation thereof, pp. 1-6.
"Search Report of Europe Counterpart Application", dated Jun. 21, 2022, pp. 1-11.

* cited by examiner

CONTROL SYSTEM AND CONTROL DEVICE

CROSS-REFERENCE TO RELATED APPLICATION

This application is a 371 application of the International PCT application serial no. PCT/JP2019/041734, filed on Oct. 24, 2019, which claims the priority benefits of Japan Patent Application No. 2018-214286, filed on Nov. 15, 2018. The entirety of each of the above-mentioned patent applications is hereby incorporated by reference herein and made a part of this specification.

TECHNICAL FIELD

The present invention relates to a control system and a control device that make it possible to realize input data processing efficiently using computing resources.

BACKGROUND ART

At various production sites, there is a demand to detect abnormalities occurring in machines, devices, or the like early and to improve the capacity utilization rate. In a typical abnormality monitoring method, data is collected from machines or devices, and it is determined whether some kind of abnormality has occurred on the basis of the collected data.

Such an abnormality monitoring process can also be realized by an upper-level device collecting data from a control device such as a programmable controller (PLC), but the implementation of the abnormality monitoring process in the control device makes it possible to realize faster abnormality determination.

More specifically, in a control device, as disclosed in Japanese Patent No. 4752983 (Patent Literature 1), an input and output program and a control program are repeatedly executed, and thus processing required for control of a control target is realized. When the abnormality monitoring process is executed by the control device, commands required for the abnormality monitoring process are included in the input and output program and the control program.

CITATION LIST

Patent Literature

[Patent Literature 1]
Japanese Patent No. 4752983

SUMMARY OF INVENTION

Technical Problem

In a case where a plurality of control programs like that disclosed in Patent Literature 1 is executed in parallel, it is also possible to use a plurality of cores within a single processor, or to use a plurality of processors.

However, even in a case where a plurality of cores or a plurality of processors can be used as computing resources, there are some processes in which the computing resources cannot be used efficiently.

One objective of the present invention is to realize efficient processing in a case where a plurality of arithmetic units can be used as computing resources.

Solution to Problem

According to an embodiment of the present invention, there is provided a control system including: a control device that executes a control arithmetic for controlling a control target; and a support device that sets content of the control arithmetic which is executed by the control device. The control device includes a first arithmetic unit for cyclically executing a first task to which one or a plurality of processes is allocated in a first control cycle and a second arithmetic unit for cyclically executing a second task to which one or a plurality of processes is allocated in a second control cycle that is longer than the first control cycle. The control arithmetic includes a data collection process of collecting input data that is capable of being referred to by the control device and a data processing process of processing the collected input data to generate new data. A first data collection process with first input data as a target and a corresponding first data processing process are allocated to the first task. A second data collection process with second input data as a target and a corresponding second data processing process are allocated to either of the first task and the second task in accordance with a setting via the support device.

According to the present embodiment, the second data collection process with the second input data as a target and the corresponding second data processing process can be allocated to either of the first task and the second task in accordance with processing performance required for input data, the attribute of the input data, or the like, and thus it is possible to realize efficient processing.

The control device may further include a third arithmetic unit for executing a third task to which one or a plurality of processes is allocated depending on a situation. According to this configuration, it is possible to provide an execution environment in which efficient processing can be executed depending on the situation in addition to the first task and the second task which are cyclically executed.

A process of storing data which is generated through the first data processing process and the second data processing process may be allocated to the third task. According to this configuration, the data which is generated through the first data processing process and the second data processing process can be stored at an appropriate timing, and thus it is possible to make a series of processes until input data is processed and stored efficient.

A process of calculating a predetermined index from data which is generated through the first data processing process and the second data processing process may be allocated to the third task. According to this configuration, even in a case where the abnormality detection process or the like is implemented, it is possible to make the process efficient.

The data processing process may include a process of calculating a feature amount from a plurality of pieces of input data collected through the data collection process. According to this configuration, even in a case where the abnormality detection process or the like is implemented, it is possible to make the process efficient.

The data processing process may include a process of converting the input data collected through the data collection process into a corresponding physical quantity. According to this configuration, preprocessing or the like is not required in various analysis processes or the like, and thus it is possible to realize efficient data utilization.

The data processing process may include a process of forming one or a plurality of pieces of input data collected through the data collection process into a predetermined format. According to this configuration, even in a case where data is required to be transferred to the outside, or the like, it is possible to realize efficient processing.

In a case where the second data collection process and the second data processing process are capable of being allocated to both the first task and the second task, the support device may accept a setting of which task these processes are allocated to. According to this configuration, it is possible to help a user allocate the data collection process and the data processing process which are targets to an appropriate task out of the first task and the second task.

The support device may accept a change in an allocation destination task of the second data collection process and the second data processing process. According to this configuration, even in a case where it is determined afterward that a task to which the data collection process and the data processing process have been previously allocated is not appropriate, it is possible to make an easy change in allocation to a more appropriate task.

According to another embodiment of the present invention, there is provided a control device that executes a control arithmetic for controlling a control target. The control device includes: a first arithmetic unit for cyclically executing a first task to which one or a plurality of processes is allocated in a first control cycle; and a second arithmetic unit for cyclically executing a second task to which one or a plurality of processes is allocated in a second control cycle that is longer than the first control cycle. The control arithmetic includes a data collection process of collecting input data that is capable of being referred to by the control device and a data processing process of processing the collected input data to generate new data. A first data collection process with first input data as a target and a corresponding first data processing process are allocated to the first task. A second data collection process with second input data as a target and a corresponding second data processing process are allocated to either of the first task and the second task in accordance with an external setting.

According to the present embodiment, the second data collection process with the second input data as a target and the corresponding second data processing process can be allocated to either of the first task and the second task in accordance with processing performance required for input data, the attribute of the input data, or the like, and thus it is possible to realize efficient processing.

Advantageous Effects of Invention

According to the present invention, it is possible to realize efficient processing in a case where a plurality of arithmetic units can be used as computing resources.

DESCRIPTION OF EMBODIMENTS

Figure 1:
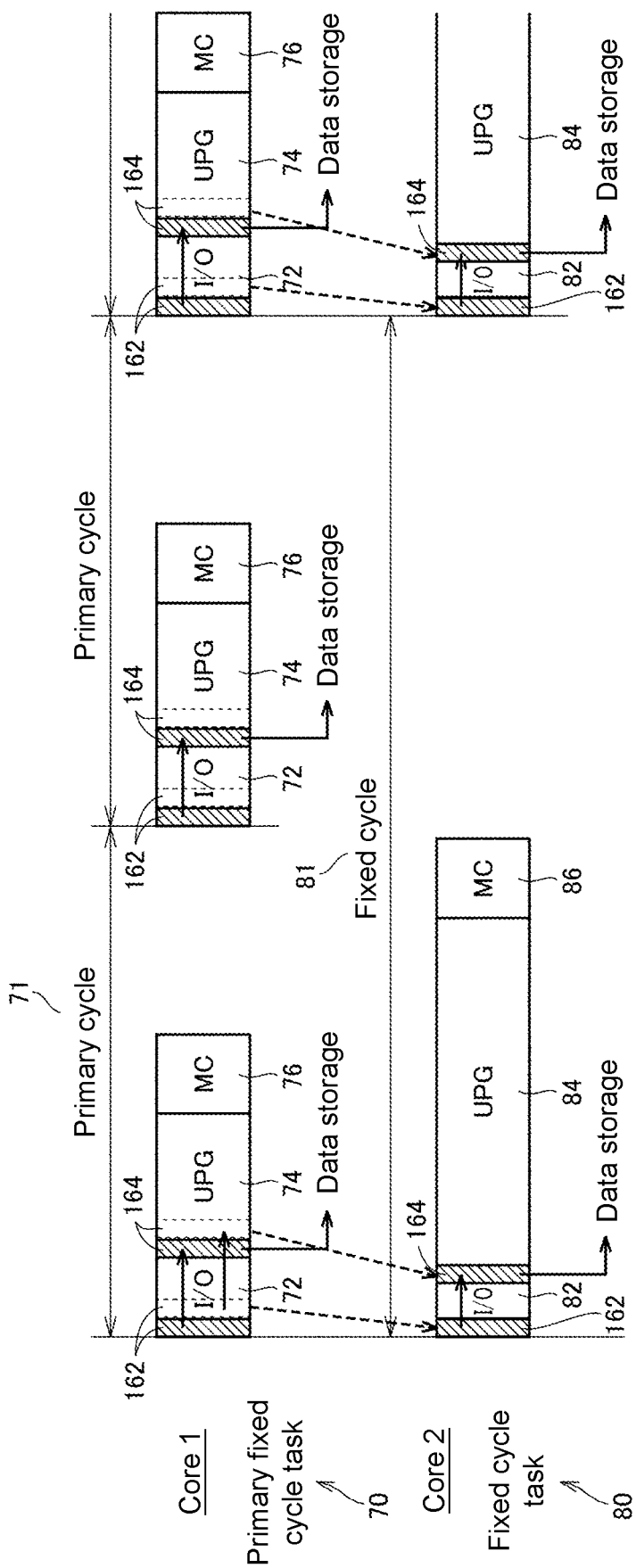
FIG. 1 is a diagram illustrating a main process of a control system according to the present embodiment.

An embodiment of the present disclosure will be described in detail with reference to the accompanying drawings. Meanwhile, the same or equivalent portions in the drawings are denoted by the same reference numerals and signs, and thus description thereof will not be repeated.

A. Application Example

As a typical example, processing when the present embodiment is applied to an abnormality monitoring process of determining whether some kind of abnormality has occurred in any monitoring target will be described, but the present embodiment is not limited thereto, and can be applied to any processing.

FIG. 1 is a diagram illustrating a main process of a control system 1 according to the present embodiment. Referring to FIG. 1, a control device 100 constituting the control system 1 executes one or a plurality of processes in units of "tasks" as a control arithmetic for controlling a control target.

In the present specification, a "task" is the execution unit of a control arithmetic, and is allocated one or a plurality of processes. FIG. 1 shows a primary fixed cycle task 70 which is cyclically executed in a primary cycle 71 (a first control cycle) and a fixed cycle task 80 which is cyclically executed in a fixed cycle 81 (a second control cycle).

The control device 100 includes a processor having a plurality of cores as will be described later, and is configured such that the primary fixed cycle task 70 is cyclically executed by one core (a first arithmetic unit) of the processor and the fixed cycle task 80 is cyclically executed by another core (a second arithmetic unit) of the processor. One or a plurality of processes is allocated to the primary fixed cycle task 70 and the fixed cycle task 80.

As an example, the primary fixed cycle task 70 includes an I/O refresh process 72, a user program execution process 74, and a motion control process 76. Similarly, the fixed cycle task 80 includes an I/O refresh process 82, a user program execution process 84, and a motion control process 86. The process contents of the I/O refresh process 82, the user program execution process 84, and the motion control process 86 are the same as the process contents of the I/O refresh process 72, the user program execution process 74, and the motion control process 76, except that their execution cycles are different from each other.

A control arithmetic which is executed by the control device 100 includes a data collection process 162 of collecting input data that is capable of being referred to by the control device 100 and a data processing process of processing the collected input data to generate new data.

In the present specification, "input data" is a term including any status value, an internal status value, a system status value, and the like capable of being referred to in a control arithmetic which is executed by the control device 100, in addition to data acquired from a control target which is acquired by a field device group 10 to be described later and transferred to the control device 100.

As an example of the data processing process, in the following description, a feature extraction process 164 of calculating a feature amount from a plurality of pieces of input data collected through the data collection process 162 will be illustrated. The feature amount which is calculated through the feature extraction process 164 is used for an abnormality monitoring process to be described later. Another example of the data processing process will be described later in the section <I. Modification example>.

Typically, the data collection process 162 and the feature extraction process 164 (the data processing process) for input data in which data processing in a short cycle is required are allocated to the primary fixed cycle task 70.

On the other hand, the data collection process 162 and the feature extraction process 164 (the data processing process) for input data in which data processing in a relatively long cycle is required can be allocated to the primary fixed cycle task 70, or can be allocated to the fixed cycle task 80.

From the viewpoint of efficiently using computing resources, the data collection process 162 and the feature extraction process 164 (the data processing process) are allocated to any of the primary fixed cycle task 70 and the fixed cycle task 80 in accordance with the setting via a support device to be described later.

By making it possible to change an allocation destination task in accordance with such a setting, it is possible to realize efficient use of computing resources.

B. Configuration Example of Control System

Next, a configuration example of the control system 1 according to the present embodiment will be described.

Figure 2:
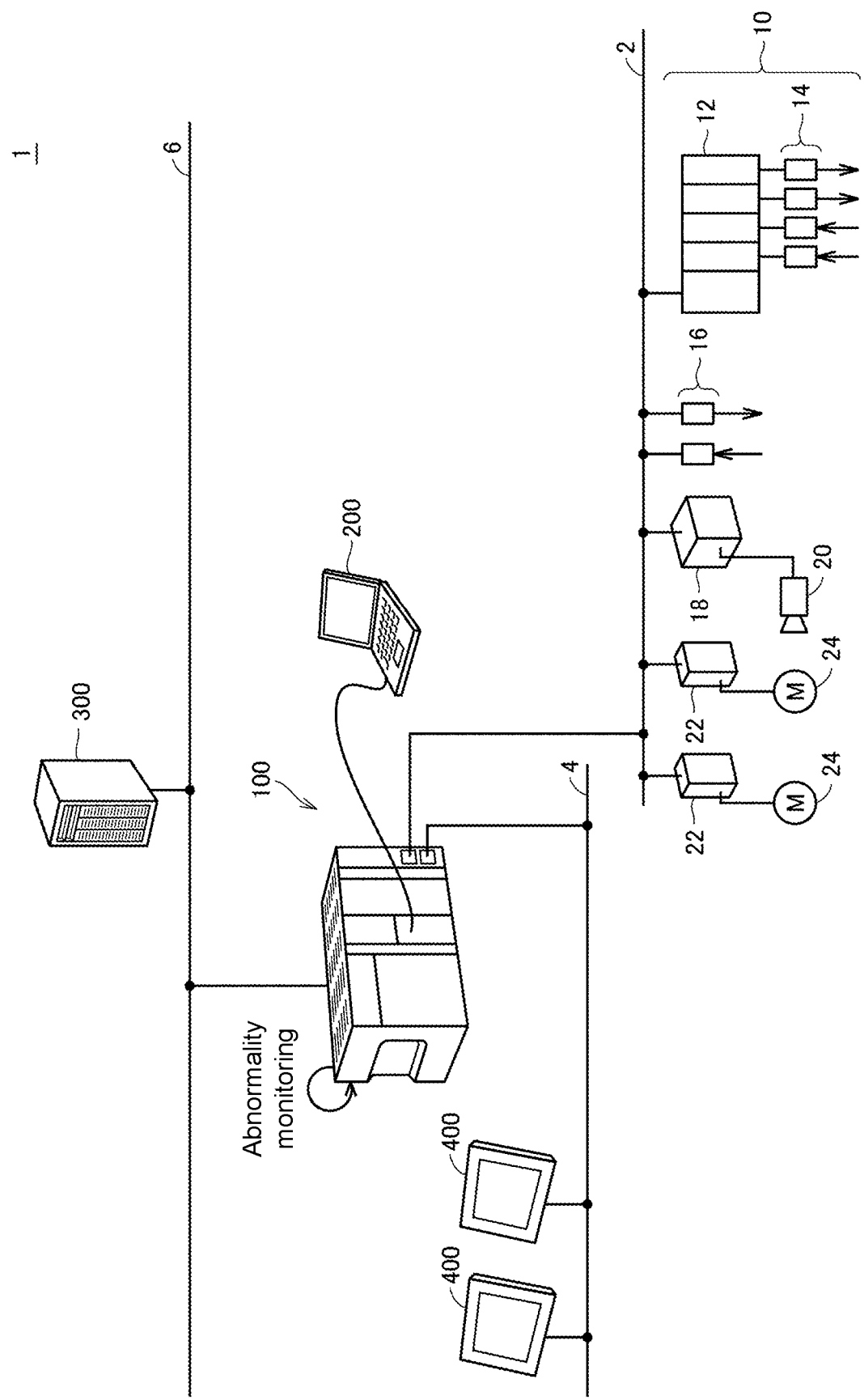
FIG. 2 is a schematic diagram illustrating an overall configuration example of the control system according to the present embodiment.

FIG. 2 is a schematic diagram illustrating an overall configuration example of the control system 1 according to the present embodiment. Referring to FIG. 2, the control system 1 includes, as main components, the control device 100 that executes a control arithmetic for controlling a control target and a support device 200 that sets the content of a control arithmetic which is executed by the control device 100. The control system 1 may further include an upper-level server 300 and a display device (human machine interface; hereinafter also referred to as an "HMI") 400 as optional components.

The control device 100 may be embodied as a kind of computer such as a programmable controller (PLC), and executes a control arithmetic for controlling a control target. The control device 100 has an abnormality monitoring function of determining whether some kind of abnormality has occurred in a monitoring target included in a control target.

The control device 100 is connected to the field device group 10 through a first field bus 2, and is connected to one or a plurality of HMIs 400 through a second field bus 4. Further, the control device 100 is connected to the upper-level server 300 through a local network 6. The control device 100 exchanges data with the connected devices through each network.

The control device 100 has a collection function of collecting data (input data) which is acquired by the field device group 10 and transferred to the control device 100.

As the first field bus 2 and the second field bus 4, it is preferable to adopt a network that performs fixed cycle communication in which time taken until arrival of data is guaranteed. As a network that performs such fixed cycle communication, EtherCAT (registered trademark) or the like is known.

The field device group 10 includes a device that collects the status value of a control target, a manufacturing device or a production line relevant to control, or the like (hereinafter also collectively referred to as a "field") as input data. An input relay, various sensors, or the like is assumed as a device that collects such a status value. The field device group 10 further includes a device that gives some kind of action to a field on the basis of a command value (hereinafter also referred to as "output data") which is generated by the control device 100. An output relay, a contactor, a servo driver, a servo motor, and any other actuators are assumed as a device that gives some kind of action to such a field. The field device group 10 exchanges data including input data and output data with the control device 100 through the first field bus 2.

In the configuration example shown in FIG. 2, the field device group 10 includes a remote input/output (I/O) device 12, a relay group 14, an image sensor 18, a camera 20, servo drivers 22, and servo motors 24.

The remote I/O device 12 includes a communication unit that performs communication through the first field bus 2 and an input and output unit (hereinafter also referred to as an "I/O unit") that acquires input data and outputs output data. The input data and the output data are exchanged between the control device 100 and a field through such an I/O unit. FIG. 2 shows an example in which digital signals are exchanged as the input data and the output data through the relay group 14.

The I/O unit may be connected directly to a field bus. FIG. 2 shows an example in which an I/O unit 16 is connected directly to the first field bus 2.

The image sensor 18 performs an image measurement process such as pattern matching on image data captured by the camera 20, and transmits the processing result to the control device 100.

The servo driver 22 drives the servo motor 24 in accordance with output data (such as, for example, a position command) from the control device 100.

As described above, data is exchanged between the control device 100 and the field device group 10 through the first field bus 2, while the exchanged data is updated in a very short cycle several hundred μsec order to several tens of msec order. Meanwhile, such a process of updating the exchanged data is also referred to as an I/O refresh process.

The support device 200 is a device that supports preparation required for the control device 100 to control a control target. Specifically, the support device 200 provides the development environment (such as a program creation and editing tool, a parser, or a compiler) of a program executed by the control device 100, a setting environment for setting parameters (configurations) of the control device 100 and various devices connected to the control device 100, a function of transmitting a generated user program to the control device 100, a function of correcting and changing online a user program or the like executed on the control device 100, and the like. Further, the support device 200 also provides a function of setting learning data and parameters for defining an abnormality monitoring process executed by the control device 100, or the like.

The upper-level server 300 is connected to the control device 100 through the local network 6, and exchanges necessary data with the control device 100. The upper-level server 300 has, for example, a database function, and collects data stored in the control device 100 periodically or on an event basis. A general-purpose protocol such as Ethernet (registered trademark) may be implemented in the local network 6.

The HMI 400 is connected to the control device 100 through the second field bus 4, accepts an operation from a user, transmits a command or the like according to the user's operation to the control device 100, and graphically displays processing results or the like in the control device 100.

C. Hardware Configuration Example of Each Device

Next, a hardware configuration example of a main device constituting the control system 1 according to the present embodiment will be described.

(c1: Hardware Configuration Example of the Control Device 100)

Figure 3:
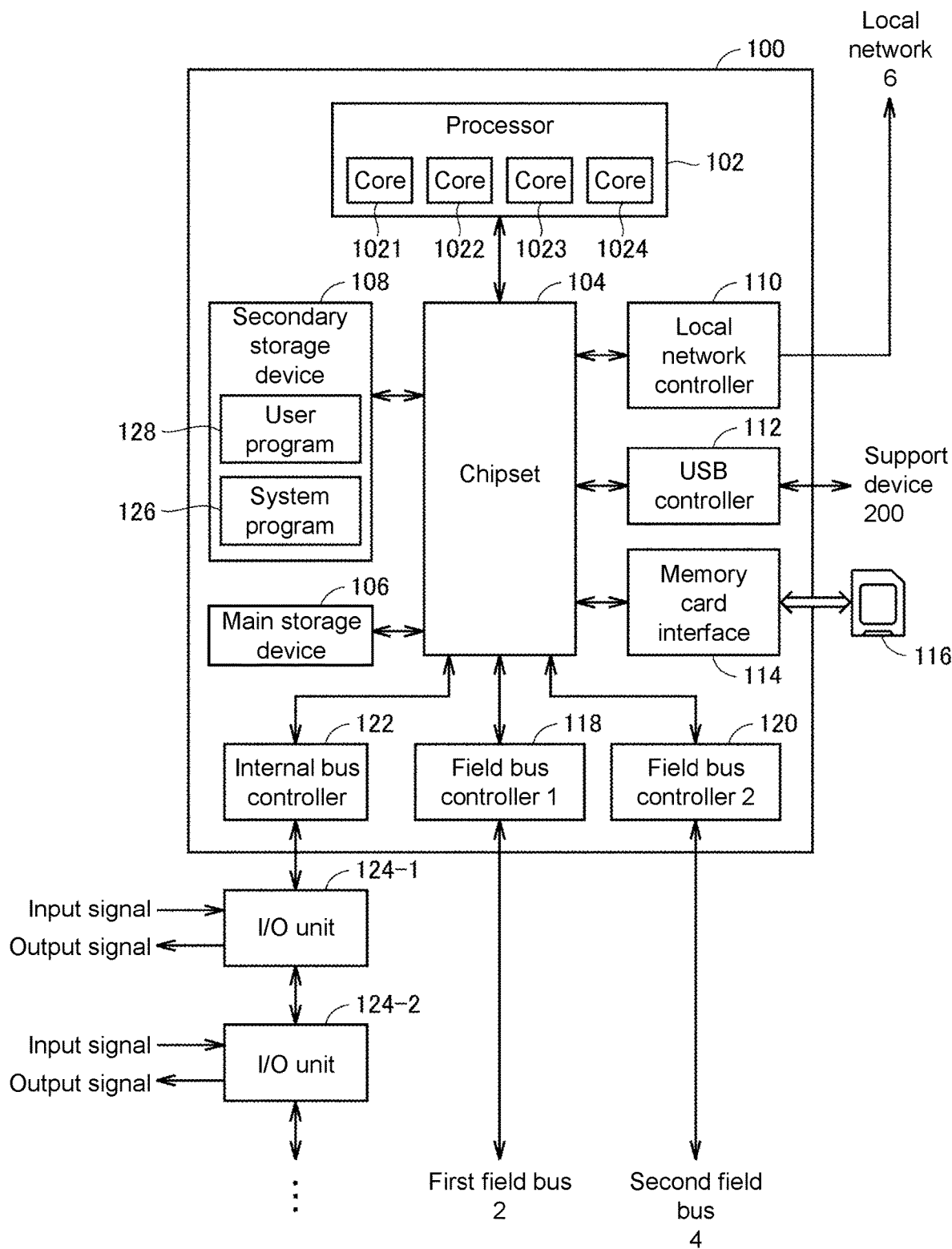
FIG. 3 is a block diagram illustrating a hardware configuration example of a control device constituting the control system according to the present embodiment.

FIG. 3 is a block diagram illustrating a hardware configuration example of the control device 100 constituting the control system 1 according to the present embodiment. Referring to FIG. 3, the control device 100 includes a processor 102 such as a central processing unit (CPU) or a micro-processing unit (MPU), a chipset 104, a main storage device 106, a secondary storage device 108, a local network controller 110, a universal serial bus (USB) controller 112, a memory card interface 114, an internal bus controller 122, and field bus controllers 118 and 120.

The processor 102 reads out various programs stored in the secondary storage device 108, and develops and executes the programs on the main storage device 106 to thereby realize control according to a control target and various processes to be described later. The processor 102 includes a plurality of cores 1021, 1022, 1023, and 1024. Each of the cores 1021, 1022, 1023, and 1024 is equivalent to an arithmetic unit. Meanwhile, although only two cores are illustrated in FIG. 3, the processor 102 having more cores may be adopted without being limited thereto.

The chipset 104 realizes processing as the entire control device 100 by controlling each component together with the processor 102.

The secondary storage device 108 stores a user program executed using an execution environment provided by a system program 126 (equivalent to a control program) in addition to the system program 126 for realizing a function provided by the control device 100.

The local network controller 110 controls exchange of data with another device with the local network 6. The USB controller 112 controls exchange of data with the support device 200 through USB connection.

The memory card interface 114 is configured to be capable of attaching and detaching a memory card 116, and can write data to the memory card 116 and read out various types of data (such as a user program or trace data) from the memory card 116.

The internal bus controller 122 is an interface that exchanges data with I/O units 124-1, 124-2, . . . which are connected to the control device 100.

The field bus controller 118 controls exchange of data with another device through the first field bus 2. Similarly, the field bus controller 120 controls exchange of data with another device through the second field bus 4.

FIG. 3 shows an example in which a single processor 102 has four cores 1021, 1022, 1024, and 1024, but the number of cores mounted in the processor 102 may be equal to or less than four, or may be more than four. Alternatively, a plurality of processors 102 having a single core may be provided. In this case, each of the processors 102 is equivalent to an arithmetic unit. Further, a plurality of processors having a plurality of cores may be provided.

In addition, FIG. 3 shows a configuration example in which necessary functions are provided by the processor 102 executing a program, but some of these provided functions may be implemented using a dedicated hardware circuit (such as, for example, an application specific integrated circuit (ASIC) or a field-programmable gate array (FPGA)).

Further, a main part of the control device 100 may be realized using hardware according to general-purpose architecture (for example, an industrial personal computer based on a general-purpose personal computer). In this case, a virtualization technique may be used to execute a plurality of operating systems (OS) having different uses in parallel and to execute a necessary application on each OS.

(c2: Hardware Configuration Example of Support Device 200)

Next, as an example, the support device 200 according to the present embodiment is realized by executing a program using hardware according to general-purpose architecture (for example, a general-purpose personal computer).

Figure 4:
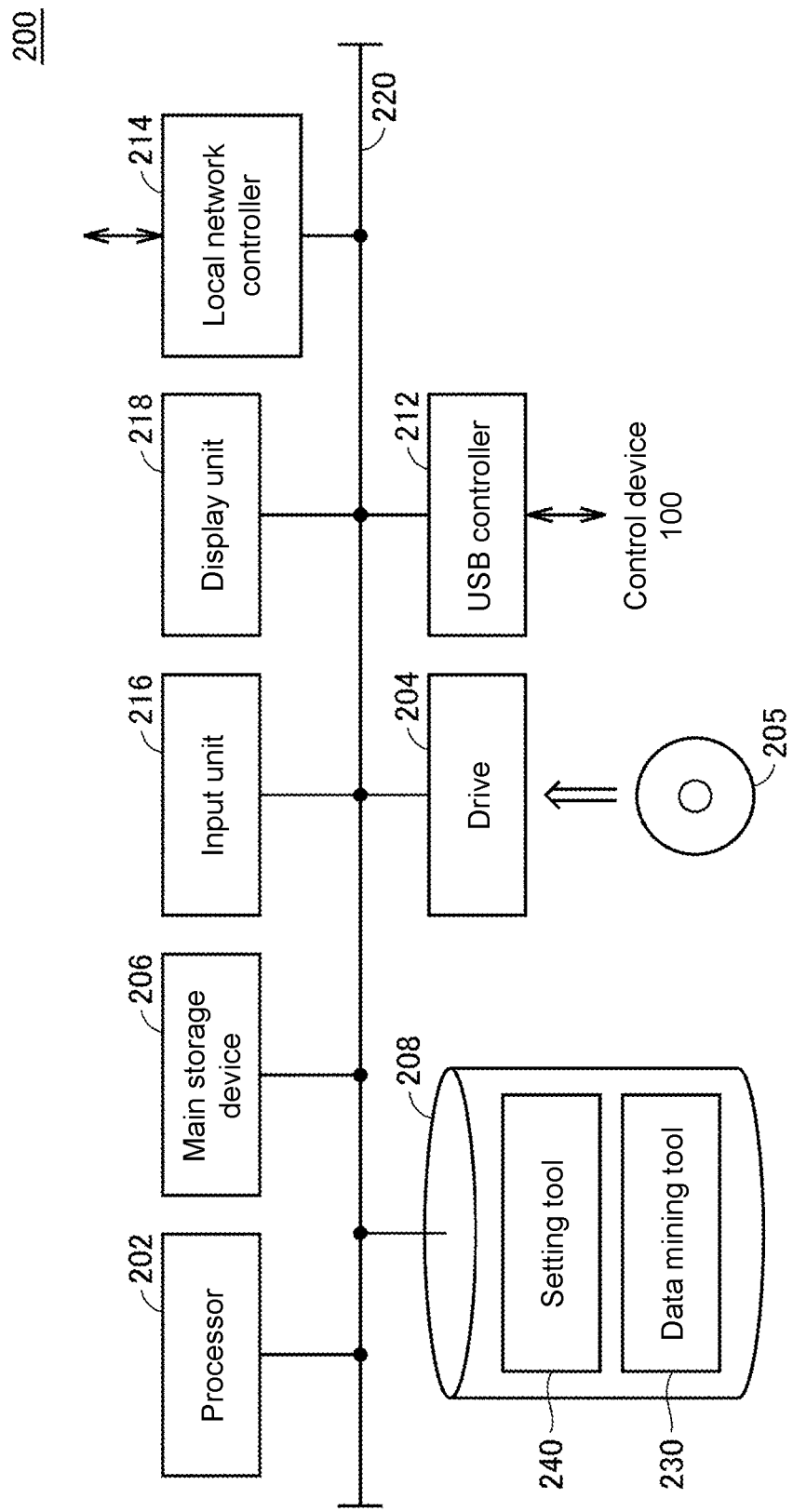
FIG. 4 is a block diagram illustrating a hardware configuration example of a support device constituting the control system according to the present embodiment.

FIG. 4 is a block diagram illustrating a hardware configuration example of the support device 200 constituting the control system 1 according to the present embodiment. Referring to FIG. 4, the support device 200 includes a processor 202 such as a CPU or an MPU, a drive 204, a main storage device 206, a secondary storage device 208, a USB controller 212, a local network controller 214, an input unit 216, and a display unit 218. These components are connected to each other through a bus 220.

The processor 202 reads out various programs stored in the secondary storage device 208, and develops and executes the programs on the main storage device 206 to thereby realize various processes to be described later.

The secondary storage device 208 is constituted by, for example, a hard disk drive (HDD), a solid state drive (SSD), or the like. The secondary storage device 208 typically stores various programs including a development program (not shown) for creating a user program which is executed in the support device 200, debugging the created program, defining a system configuration, setting various parameters, and the like, a data mining tool 230, and a setting tool 240. The secondary storage device 208 may store an OS and other necessary programs.

The drive 204 can write data to a storage medium 205 and read out various types of data (such as a user program, trace data, or time-series data) from the storage medium 205. The storage medium 205 includes, for example, the storage medium 205 (an optical storage medium such as, for example, a digital versatile disc (DVD)) that non-transiently stores a computer readable program. The program or data stored in the storage medium 205 is read by the drive 204, and is installed in an internal storage area such as the secondary storage device 208.

Various programs which are executed by the support device 200 may be installed through the computer readable storage medium 205, or may be installed in the form of downloading the programs from a server device or the like on a network. In addition, functions which are provided by the support device 200 according to the present embodiment may be realized in the form of using some of modules which are provided by an OS.

The USB controller 212 controls exchange of data with the control device 100 through USB connection. The local network controller 214 controls exchange of data with another device through any network.

The input unit 216 is constituted by a keyboard, a mouse, or the like, and accepts a user's operation. The display unit 218 is constituted by a display, various indicators, or the like, and outputs processing results or the like from the processor 202. A printer may be connected to the support device 200.

FIG. 4 shows a configuration example in which necessary functions are provided by the processor 202 executing a program, but some or all of these provided functions may be implemented using a dedicated hardware circuit (such as, for example, an ASIC or an FPGA).

(c3: Hardware Configuration Example of Upper-Level Server 300)

As an example, the upper-level server 300 according to the present embodiment is realized by executing a program using hardware according to general-purpose architecture (for example, a general-purpose server). The hardware configuration is the same as the hardware configuration of the support device 200 shown in FIG. 4, and thus detailed description thereof will not be repeated.

(c4: Hardware Configuration Example of HMI 400)

As an example, the HMI 400 according to the present embodiment is realized by executing a program using hardware according to general-purpose architecture (for example, an industrial personal computer based on a general-purpose personal computer). The hardware configuration is the same as the hardware configuration of the support device 200 shown in FIG. 4, and thus detailed description thereof will not be repeated.

D: Abnormality Monitoring Process

Next, an abnormality monitoring process which is provided by the control system 1 according to the present embodiment will be described.

Figure 5:
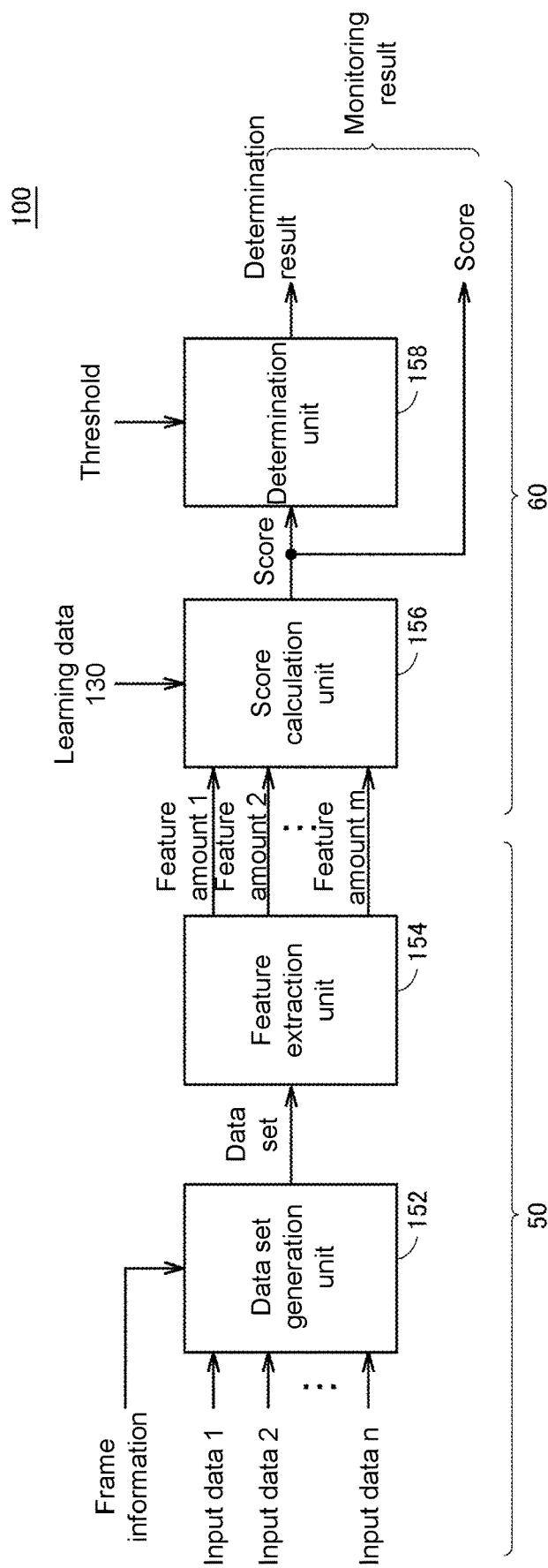
FIG. 5 is a functional block diagram for realizing an abnormality monitoring process in the control system according to the present embodiment.

FIG. 5 is a functional block diagram for realizing an abnormality monitoring process in the control system 1 according to the present embodiment. Referring to FIG. 5, the control device 100 collects one or a plurality of pieces of input data (input data 1, input data 2, . . . , input data n) from a monitoring target and extracts a feature amount to thereby output a monitoring result including a determination result indicating the presence or absence of the occurrence of an abnormality.

In the present embodiment, the concept of a "frame" is introduced as a unit interval for determining whether some kind of abnormality has occurred in a monitoring target included in a control target. The frame means a unit interval for determining whether some kind of abnormality has occurred in a monitoring target. Therefore, the determination of whether some kind of abnormality has occurred in a monitoring target is performed for each frame.

More specifically, the control device 100 includes a data set generation unit 152, a feature extraction unit 154, a score calculation unit 156, and a determination unit 158 as main functional components relating to the abnormality monitoring process.

The data set generation unit 152 generates a data set composed of one or a plurality of pieces of input data (input data 1, input data 2, . . . , input data n) for each frame from a monitoring target in accordance with frame information.

The feature extraction unit 154 extracts one or a plurality of feature amounts (a feature amount 1, a feature amount 2, . . . , a feature amount m) in accordance with processing determined in advance on the basis of the data set which is generated by the data set generation unit 152. Examples of the feature amount capable of being used include an average value, a maximum value, an intermediate value, a minimum value, standard deviation, and the like within a frame.

The score calculation unit 156 refers to learning data 130 prepared in advance, and calculates a value indicating the degree of deviation (hereinafter also referred to as a "score") with respect to the learning data 130 of one or a plurality of feature amounts extracted by the feature extraction unit 154. Here, the learning data 130 is composed of feature amounts labeled with a specific class (for example, normality or abnormality). Typically, the learning data 130 is composed of feature amounts during a normal state, and in this case, the score means a value indicating the possibility of some kind of abnormality having occurred in a monitoring target.

As an example of an abnormality monitoring algorithm in the control device 100, a method of calculating a score corresponding to a feature amount on the basis of the degree of deviation of the feature amount with respect to a value group in a hyperspace is adopted. In this case, the learning data 130 indicates a value group in a hyperspace, which is equivalent to a "model" indicating a monitoring target.

Examples of such a known abnormality monitoring method based on the degree of deviation include a method of detecting an abnormality on the basis of a shortest distance from each point to a value group (k-nearest neighbors algorithm), a local outlier factor (LoF) method of evaluating a distance inclusive of a cluster including a value group, an isolation forest (iForest) method using a score calculated from a path length, and the like.

In a case where the abnormality monitoring method based on the degree of deviation is adopted, the learning data 130 includes a group of feature amounts obtained during a normal state, and the control device 100 calculates a score which is a value indicating the possibility of some kind of abnormality having occurred in a monitoring target on the basis of the degree of deviation of a target feature amount with respect to a feature amount group included in the learning data 130.

The determination unit 158 compares a score calculated by the score calculation unit 156 with a threshold determined in advance, and determines whether some kind of abnormality has occurred in a monitoring target. The determination unit 158 outputs a determination result indicating whether some kind of abnormality has occurred.

With the above-described functional configuration, the abnormality monitoring process according to the present embodiment is realized.

In the functional block diagram shown in FIG. 5, the processes in the data set generation unit 152 and the feature extraction unit 154 are for input data which is a status value collected from a field or an internal status value calculated or updated by the execution of a control arithmetic, and are collectively referred to as "input data processing 50" below. On the other hand, the processes in the score calculation unit 156 and the determination unit 158 are for using results calculated through the input data processing 50, and are collectively referred to as a "data use process 60" below.

E. Cyclic Execution of Program

Next, cyclic execution of a program in the control device 100 according to the present embodiment will be described.

Figure 6:
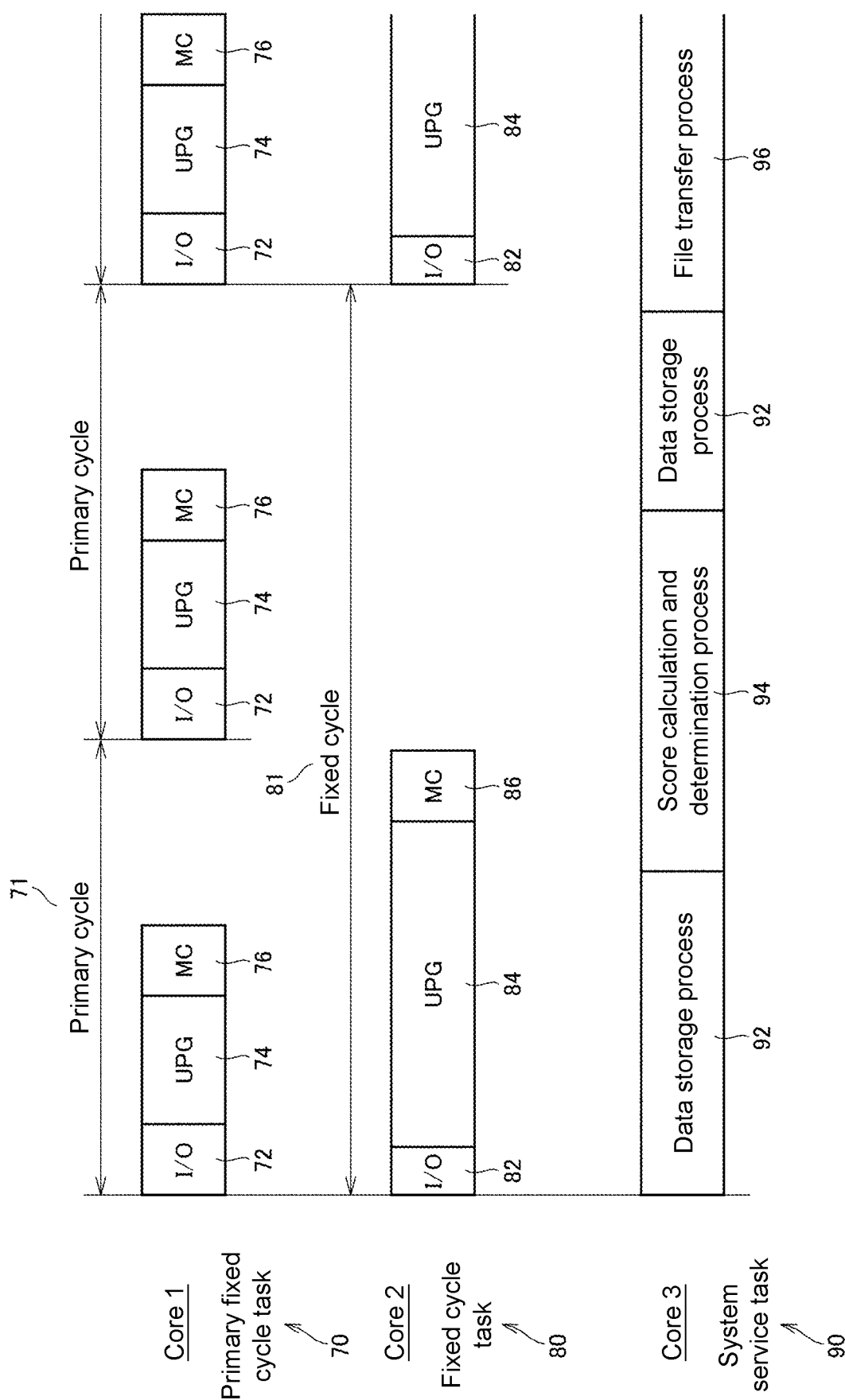
FIG. 6 is a schematic diagram illustrating an example of cyclic execution of a program in the control device constituting the control system according to the present embodiment.

FIG. 6 is a schematic diagram illustrating an example of cyclic execution of a program in the control device 100 constituting the control system 1 according to the present embodiment. In the control device 100, one or a plurality of processes is executed in units of tasks.

FIG. 6 shows an example in which three types of tasks, that is, the primary fixed cycle task 70, the fixed cycle task 80, and a system service task 90, are executed. Each of the tasks is assumed to be executed by a separate core.

The primary fixed cycle task 70 which is executed by a core 1 includes a process to be executed with the highest priority in the control device 100, and is cyclically executed for primary cycle 71 equivalent to a control cycle.

More specifically, the primary fixed cycle task 70 includes the I/O refresh process 72, the user program execution process 74, and the motion control process 76. The I/O refresh process 72 is a process of updating input data and output data to and from a field. Meanwhile, in the control device 100, since values referred to in a program are managed in the form of variables, the I/O refresh process 72 means a process of cyclically updating a value of a corresponding variable. The user program execution process 74 is a process of executing a process in accordance with a command described in a user program 128. The user program 128 is arbitrarily created in accordance with a control target, and includes a sequence program or the like described using the language specified in IEC61131-3.

The motion control process 76 includes a process according to a motion command included in the user program 128 (typically, a process relating to position control or speed control of a motor).

In the primary fixed cycle task 70, the I/O refresh process 72, the user program execution process 74, and the motion control process 76 are all executed for each primary cycle 71.

The fixed cycle task 80 which is executed by a core 2 includes a process having a lower priority than the primary fixed cycle task 70, and is cyclically executed for each fixed cycle 81 equivalent to an integer multiple of a control cycle. The fixed cycle 81 is equivalent to the length of an integer multiple (two or more) of the primary fixed cycle task 70.

More specifically, similarly to the primary fixed cycle task 70, the fixed cycle task 80 includes the I/O refresh process 82, the user program execution process 84, and the motion control process 86. The process contents of the I/O refresh process 82, the user program execution process 84, and the motion control process 86 are the same as the process contents of the I/O refresh process 72, the user program execution process 74, and the motion control process 76, except that their execution cycles are different from each other.

The system service task 90 which is executed in a core 3 is executed depending on the situation. Typically, the system service task 90 is allocated a process to be executed every time an event occurs. More specifically, the system service task 90 includes a data storage process 92, a score calculation and determination process 94, a file transfer process 96, and the like.

The data storage process 92 includes a process of storing one or a plurality of pieces of input data referred to by the data set generation unit 152 and one or a plurality of feature amounts generated by the feature extraction unit 154 in a storage area such as the main storage device 106 or the secondary storage device 108. That is, the system service task 90 is allocated a process of storing data which is generated through the feature extraction process 164 allocated to the primary fixed cycle task 70 and the feature extraction process 164 allocated to the fixed cycle task 80.

The score calculation and determination process 94 is equivalent to a process in the score calculation unit 156 and the determination unit 158. That is, the system service task 90 is allocated a process of calculating a predetermined index from data which is generated through the feature extraction process 164 allocated to the primary fixed cycle task 70 and the feature extraction process 164 allocated to the fixed cycle task 80.

The file transfer process 96 includes a process of transmitting the data stored in a storage area such as the main storage device 106 or the secondary storage device 108 to the upper-level server 300 or the like.

F. Implementation Example of Abnormality Monitoring Process

Next, an implementation example in which the abnormality monitoring process is realized using the cyclic execution of a program shown in FIG. 6 will be described.

Figure 7:
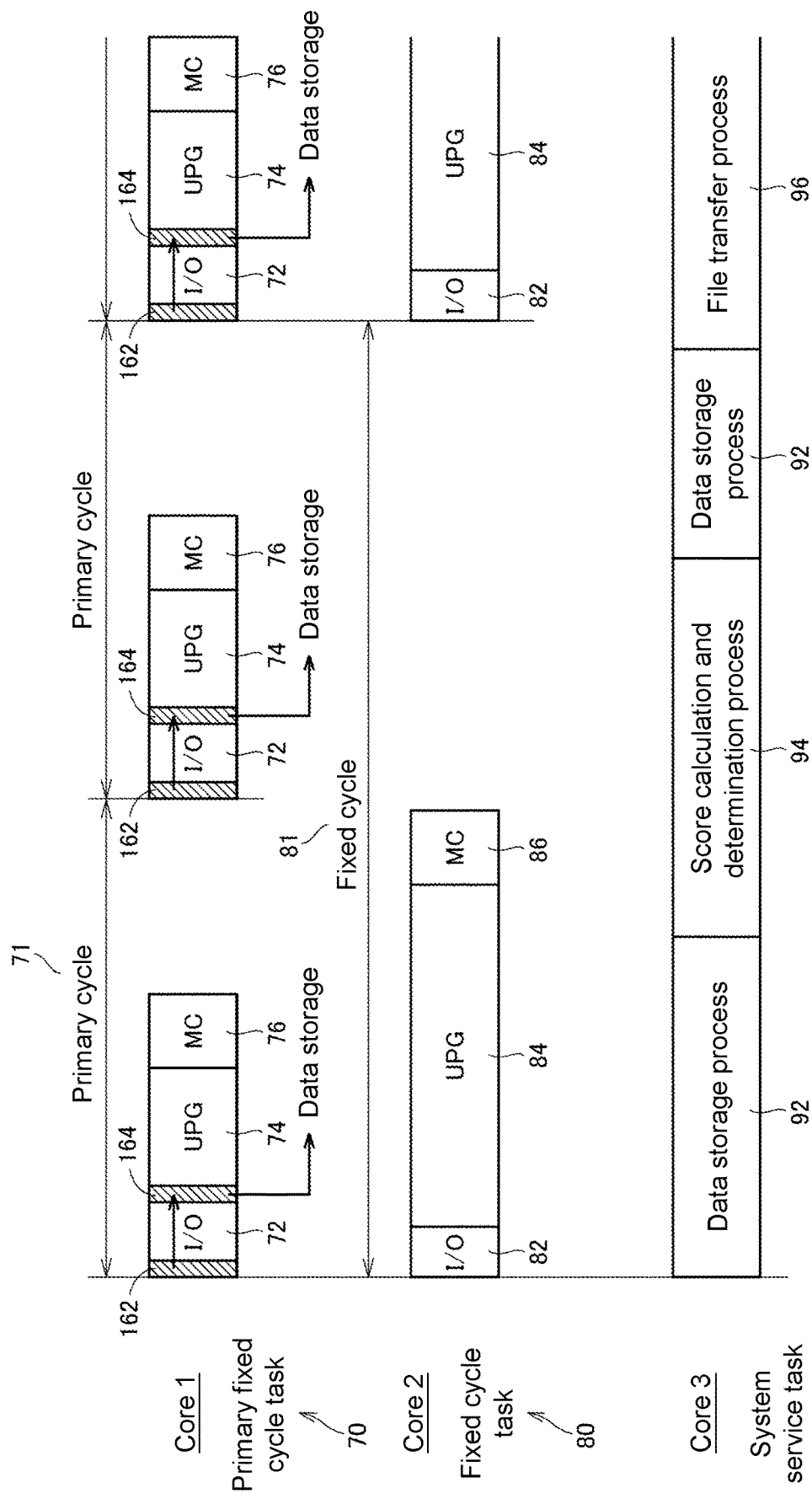
FIG. 7 is a schematic diagram illustrating an implementation example relating to the abnormality monitoring process in the control device constituting the control system according to the present embodiment.

FIG. 7 is a schematic diagram illustrating an implementation example relating to the abnormality monitoring process in the control device 100 constituting the control system 1 according to the present embodiment. Referring to FIG. 7, the processing in the data set generation unit 152 and the feature extraction unit 154 (the input data processing 50) are basically cyclically executed as the primary fixed cycle task 70.

More specifically, at least a portion of the data collection process 162 regarding one or a plurality of pieces of input data (sensing data obtained from a monitoring target) which is performed the data set generation unit 152 is included in the I/O refresh process 72. In addition, at least a portion of the feature extraction process 164 which is performed by the feature extraction unit 154 is included in the user program execution process 74. A feature amount extracted through the feature extraction process 164 is stored in the storage area of the control device 100 together with identification information for specifying the frame of a target (data storage).

As shown in FIG. 7, the processes relating to the collection of input data and the extraction of a feature amount are executed for each primary cycle 71. Meanwhile, since the feature amount is extracted on the basis of data set composed of data of each frame, it is not necessarily extracted for each primary cycle 71.

The feature amount which is used in the abnormality monitoring process is arbitrarily selected in accordance with a monitoring target. That is, in the abnormality monitoring process, any type of feature amount is extracted from any input data. For any input data, not only a status value collected directly from a field but also the result of execution of predetermined preprocessing or the like may be used. Such preprocessing can be included in the primary fixed cycle task 70, or may be included in the fixed cycle task 80.

Figure 8:
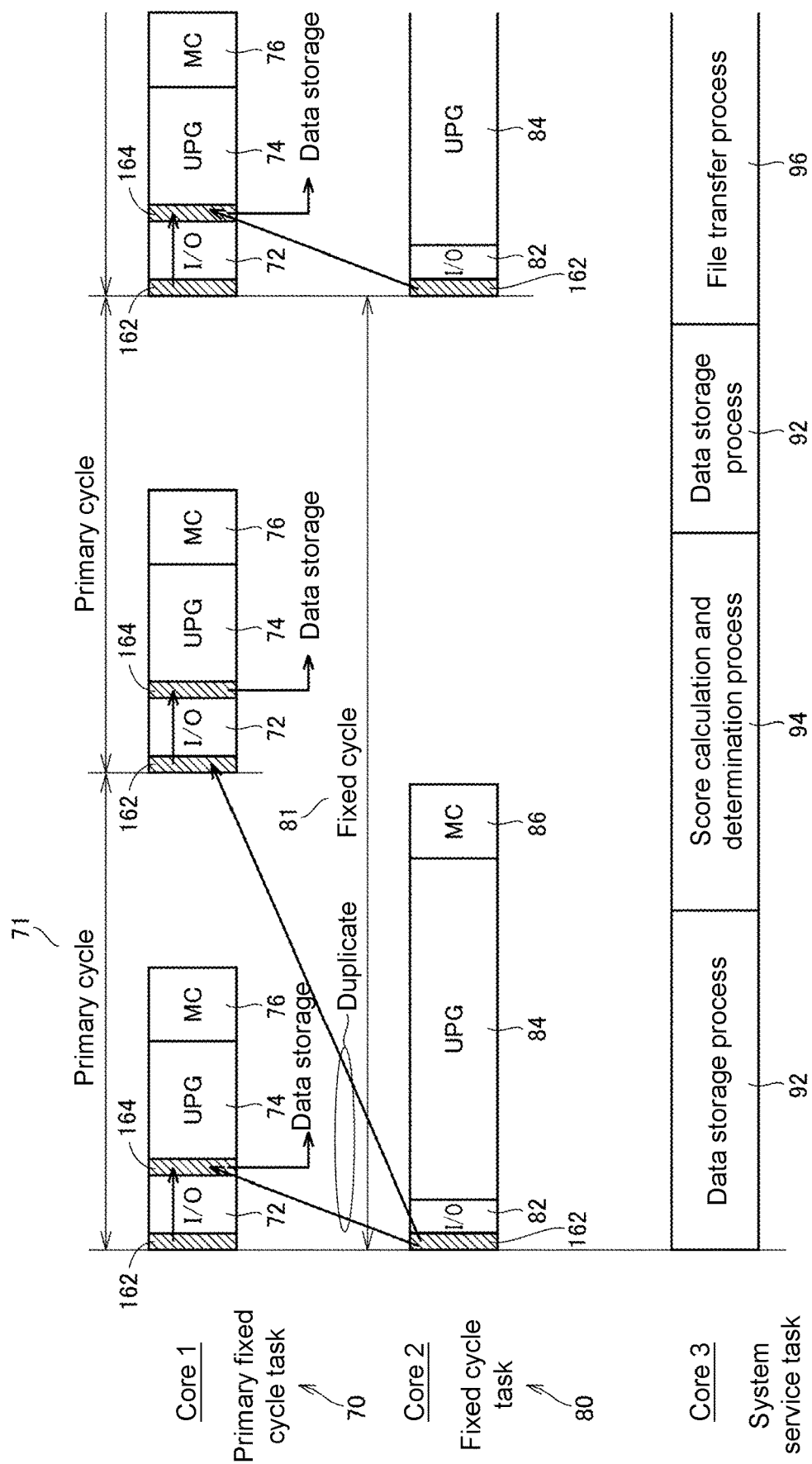
FIG. 8 is a schematic diagram illustrating another implementation example relating to the abnormality monitoring process in the control device constituting the control system according to the present embodiment.

FIG. 8 is a schematic diagram illustrating another implementation example relating to the abnormality monitoring process in the control device 100 constituting the control system 1 according to the present embodiment. Referring to FIG. 8, in the feature extraction process 164 which is performed by the feature extraction unit 154, a feature amount is extracted using input data which is cyclically updated through the data collection process 162 of the fixed cycle task 80 in addition to input data which is cyclically updated through the data collection process 162 of the primary fixed cycle task 70.

In the example shown in FIG. 8, the feature extraction process 164 included in the primary fixed cycle task 70 is cyclically executed for each primary cycle 71, whereas the update cycle of input data in the data collection process 162 of the fixed cycle task 80 is set to the fixed cycle 81. As a result, a process of extracting a feature amount from input data through the data collection process 162 of the fixed cycle task 80 is executed in duplicate. This means that a process of extracting an unnecessary feature amount is executed.

In the control device 100, it is necessary to repeatedly execute each task for each specified cycle using finite computing resources, and there is a potential demand to eliminate inefficient processing as shown in FIG. 8 as much as possible. That is, there is a demand to reduce an influence on control performance which is provided by the control device 100.

In response to such a demand, as will be described, the control device 100 according to the present embodiment provides a data processing structure that makes it possible to optimize the update of input data and the extraction of a feature amount for each of a plurality of tasks executed in parallel.

Figure 9:
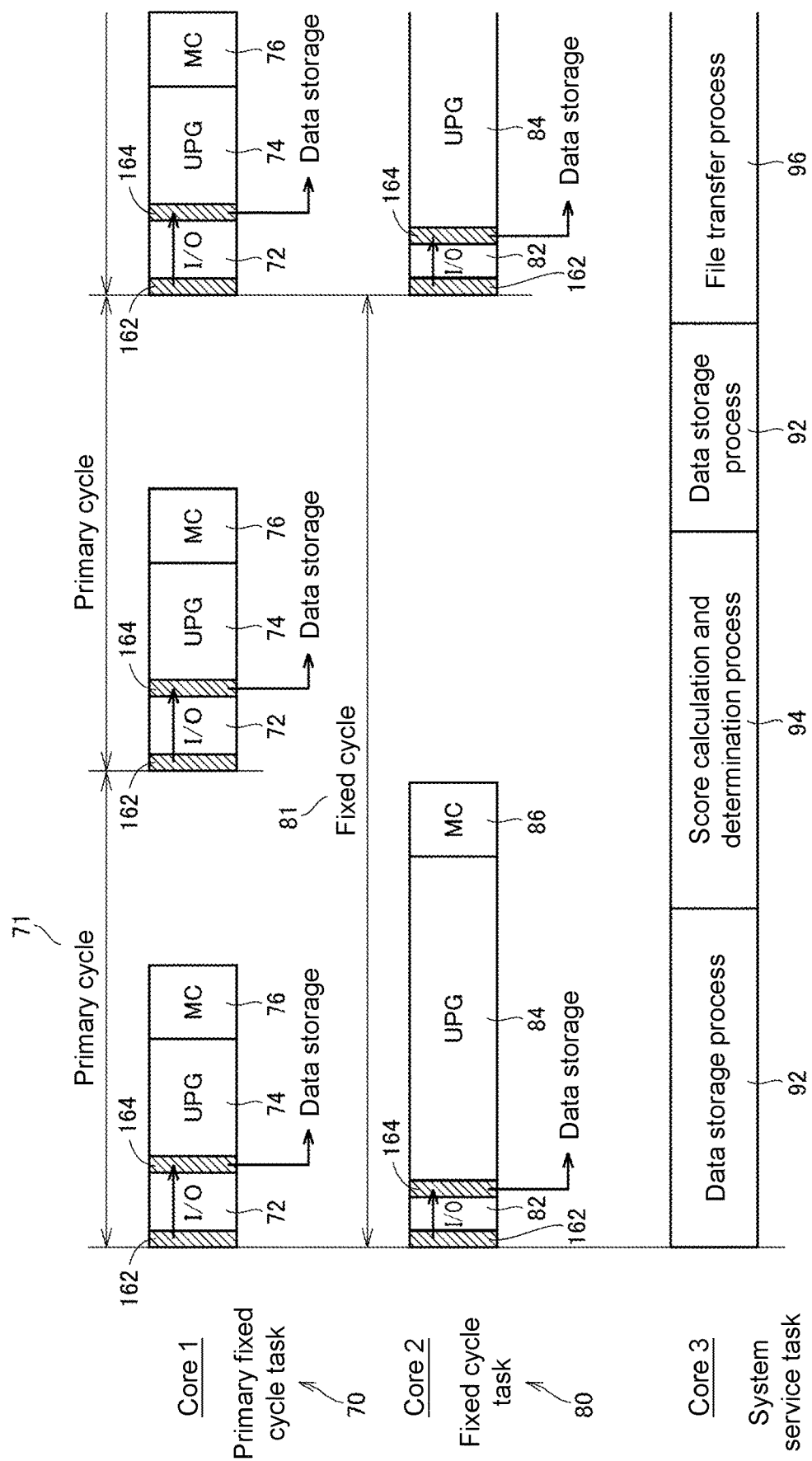
FIG. 9 is a schematic diagram illustrating still another implementation example relating to the abnormality monitoring process in the control device constituting the control system according to the present embodiment.

FIG. 9 is a schematic diagram illustrating still another implementation example relating to the abnormality monitoring process in the control device 100 constituting the control system 1 according to the present embodiment. In the implementation example shown in FIG. 9, the feature extraction process 164 which is performed by the feature extraction unit 154 is also included in the user program execution process 84 of the fixed cycle task 80. The feature extraction process 164 of the user program execution process 84 extracts a feature amount from input data which is cyclically updated through the data collection process 162 of the fixed cycle task 80.

That is, in the implementation example shown in FIG. 9, the input data processing 50 using input data which is updated for each primary cycle 71 in the primary fixed cycle task 70 is executed as the same primary fixed cycle task 70, and the input data processing 50 using input data which is updated for each fixed cycle 81 in the fixed cycle task 80 is executed as the same fixed cycle task 80.

By adopting the structure as shown in FIG. 9, it is possible to realize a process of efficiently extracting a feature amount. By efficiently using computing resources, the possibility of the cycle of each task being exceeded or the like can be reduced.

G. Data Processing

Next, an example of data processing for realizing a process of extracting a feature amount for each task as shown in FIG. 9 will be described.

Figure 10:
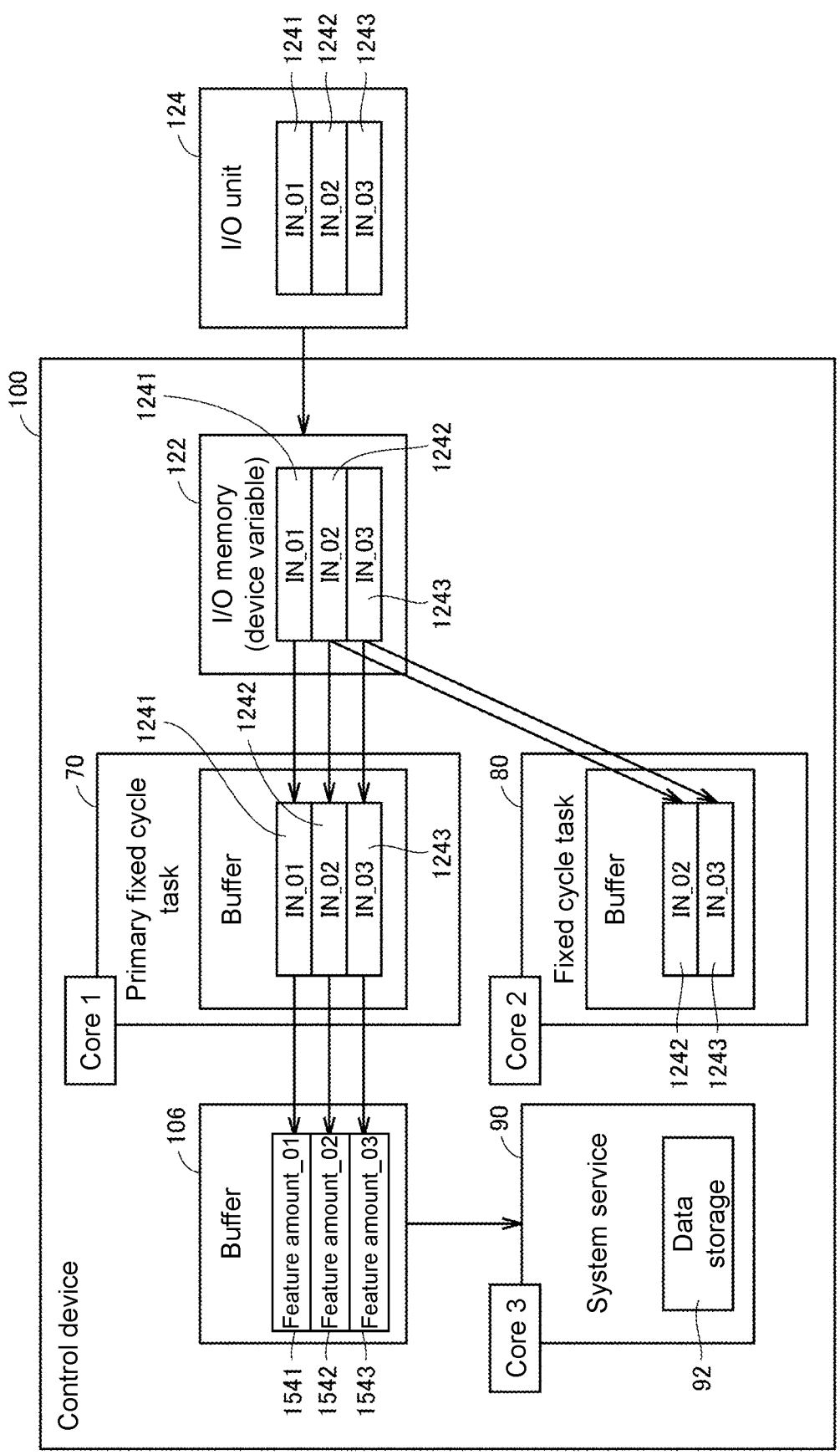
FIG. 10 is a schematic diagram illustrating data processing corresponding to the implementation example of the abnormality monitoring process shown in FIG. 8.

FIG. 10 is a schematic diagram illustrating data processing corresponding to the implementation example of the abnormality monitoring process shown in FIG. 8. Referring to FIG. 10, as an example, it is assumed that the I/O unit 124 cyclically acquires three pieces of input data (IN_01, IN_02, and IN_03) from a field.

Here, it is assumed that the input data IN_01 is referred to in the primary fixed cycle task 70, the input data IN_02 is referred to in the fixed cycle task 80, and the input data IN_03 is referred to in the primary fixed cycle task 70 and the fixed cycle task 80.

The input data acquired by the I/O unit 124 is cyclically transferred to the I/O memory of the internal bus controller 122. That is, the content of the I/O memory of the internal bus controller 122 is cyclically updated. Here, the input data IN_01, IN_02, and IN_03 are updated for each primary cycle 71.

In the primary fixed cycle task 70, the input data IN_02 required only for feature amount extraction is also transferred to a buffer in addition to the input data IN_01 and IN_03 required for feature amount extraction and a control arithmetic. The transfer thereof to the buffer is repeatedly executed for each primary cycle 71. A feature amount_01, a feature amount_02, and a feature amount_03 are extracted from the input data IN_01, IN_02, and IN_03 transferred to the buffer, and are further written to a buffer within the main storage device 106 that is capable of being referred to by the system service task 90. In the system service task 90, the data storage process 92 is executed by referring to the buffer within the main storage device 106.

On the other hand, in the fixed cycle task 80, the input data IN_02 and IN_03 required for a control arithmetic are transferred to the buffer. The control arithmetic is executed on the basis of the input data IN_02 and IN_03 transferred to the buffer.

In the data processing shown in FIG. 10, the input data IN_02 is transferred from the I/O memory of the internal bus controller 122 to the buffer only for feature amount extraction in the primary fixed cycle task 70, which leads to inefficient use of computing resources.

Figure 11:
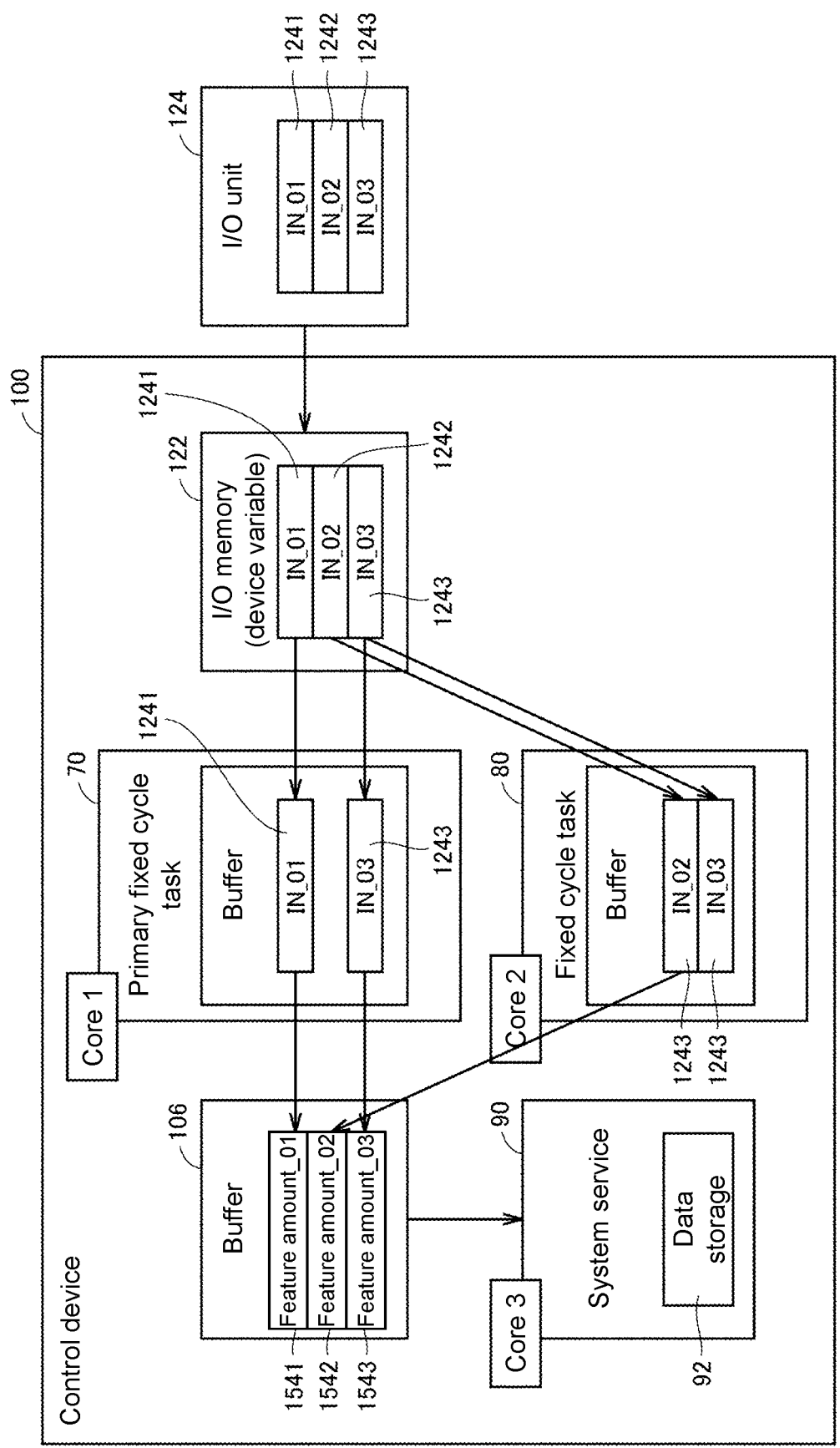
FIG. 11 is a schematic diagram illustrating data processing corresponding to the implementation example of the abnormality monitoring process shown in FIG. 9.

FIG. 11 is a schematic diagram illustrating data processing corresponding to the implementation example of the abnormality monitoring process shown in FIG. 9. In contrast to the data processing shown in FIG. 10, in the data processing shown in FIG. 11, the input data IN_02 is referred to only in the fixed cycle task 80. Therefore, the input data IN_02 is not transferred to the buffer in the primary fixed cycle task 70. That is, the input data IN_02 is not transferred to the buffer only in the fixed cycle task 80. As a result, the cycle of transfer of the input data IN_02 to the buffer is not the primary cycle 71, but the fixed cycle 81.

In the fixed cycle task 80, the feature amount_02 is extracted from the input data IN_02 transferred to the buffer, and is further written to the buffer within the main storage device 106 that is capable of being referred to by the system service task 90.

In this manner, regarding the input data IN_02 which is not referred to in a control arithmetic in the primary fixed cycle task 70, processing such as the transfer thereof to the buffer in the primary cycle 71 or the extraction of a feature amount in the primary fixed cycle task 70 is not performed, and the feature amount is extracted in the same fixed cycle 81 as the cycle of transfer to the buffer. Thereby, it is possible to avoid an inefficient feature amount extraction process or the like, and to realize efficient use of computing resources.

H. User Interface

Next, an example of a user interface for realizing the abnormality monitoring process shown in FIGS. 8 to 11 will be described.

As shown in FIGS. 8 to 11, in a case where the input data processing 50 is allocated to each of tasks which are cyclically executed in different cycles, it is necessary to register the data collection process 162 and the feature extraction process 164 corresponding to each piece of input data in the same task. For example, for the same input data, it is necessary to avoid a setting in which the data collection process 162 is included in the primary fixed cycle task 70 and the feature extraction process 164 is included in the fixed cycle task 80.

That is, in a case where the input data processing 50 such as the extraction of each feature amount is attempted to be executed in a plurality of different cycles, it is preferable to provide a user with a structure that can easily set in which cycle the extraction of each feature amount becomes efficient.

Consequently, the control system 1 according to the present embodiment provides a user interface capable of optimizing the allocation of the input data processing 50 in accordance with input data to be referred to. In the control system 1 according to the present embodiment, a user interface for performing various settings is typically provided by the support device 200.

Figure 12:
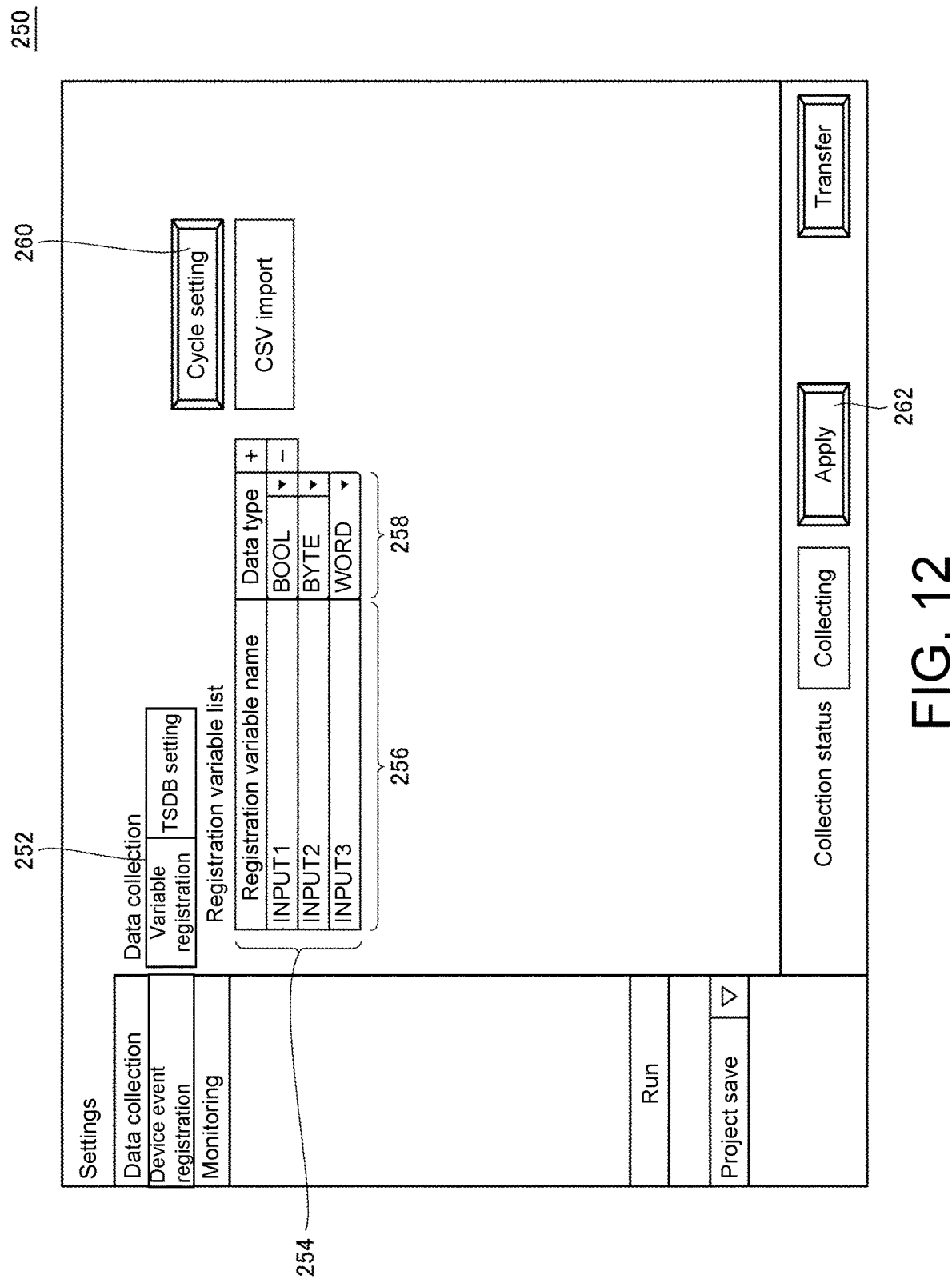
FIG. 12 is a diagram illustrating an example of a user interface screen which is provided by the support device constituting the control system according to the present embodiment.

FIG. 12 is a diagram illustrating an example of a user interface screen which is provided by the support device 200 constituting the control system 1 according to the present embodiment. A user interface screen 250 shown in FIG. 12 accepts various settings. When a setting registration button 252 is selected, the user interface screen 250 enters a setting acceptance state of input data (registration variable) used for the input data processing 50.

A user sets input data (variable) used for the extraction of a feature amount in a registration variable name setting field 256. In this case, the user sets the data type of the set input data in a data type setting field 258. Meanwhile, the data type of the data type setting field 258 may be automatically reflected corresponding to the set input data by referring to setting information or the like.

Meanwhile, it is assumed that INPUT1, INPUT2, and INPUT3 shown in FIG. 12 correspond to the input data IN_01, IN_02, and IN_03 shown in FIGS. 10 and 11, respectively.

The user interface screen 250 has a cycle setting button 260, and when the cycle setting button 260 is selected, it is possible to set which cycle (task) is allocated input data that can be allocated to any of a plurality of different cycles (tasks).

Figure 13:
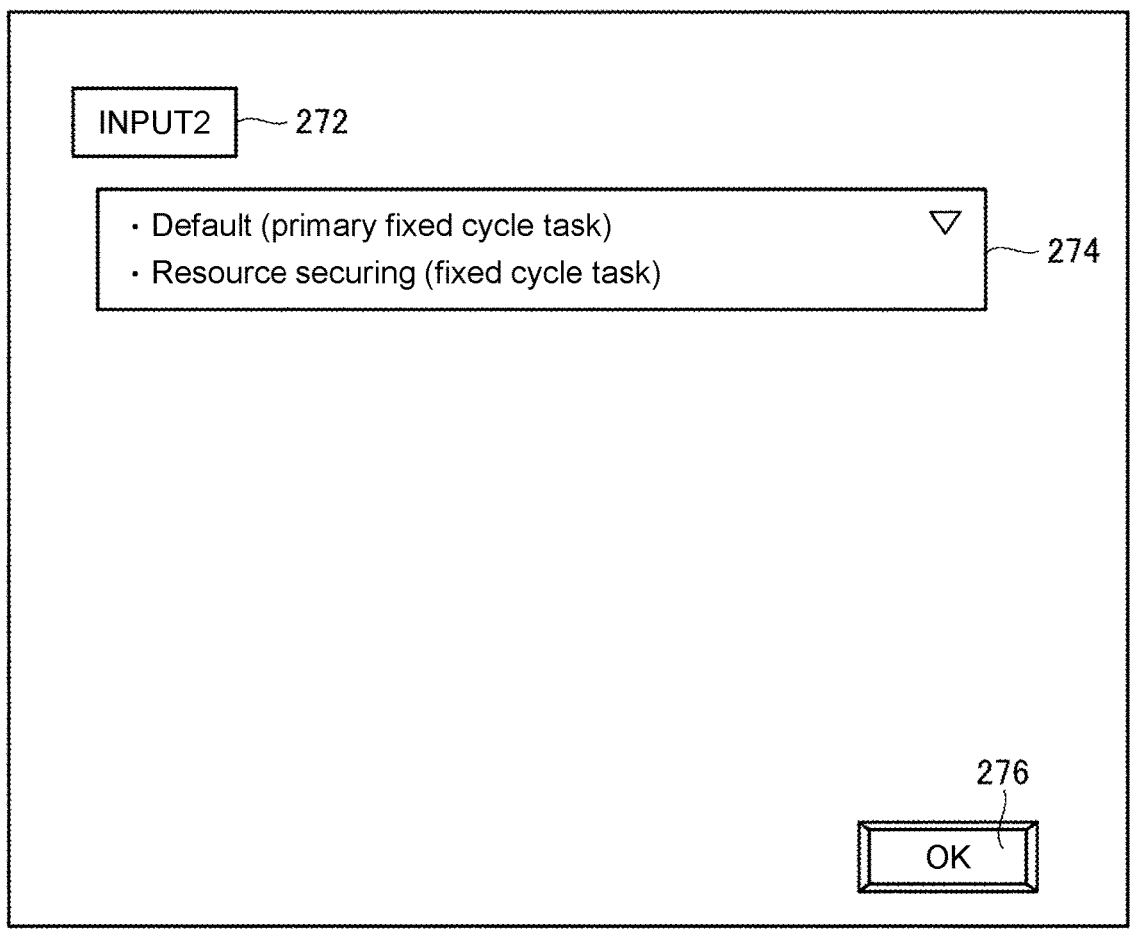
FIG. 13 is a diagram illustrating an example of a user interface screen in a case where a cycle setting button on the user interface screen of FIG. 12 is selected.

FIG. 13 is a diagram illustrating an example of a user interface screen 270 in a case where the cycle setting button 260 of the user interface screen 250 of FIG. 12 is selected. The user interface screen 270 shown in FIG. 13 displays input data (variables) that can be allocated to tasks which are executed in a plurality of different cycles, and accepts selection of which task the input data is allocated to.

More specifically, the user interface screen 270 includes a target variable display 272 that displays input data which is a target and a task selection field 274. In the task selection field 274, as an example, (1) default setting and (2) control resource securing setting can be selected. When (1) default setting is selected, the input data processing 50 of input data which is a target is allocated to the primary fixed cycle task 70. On the other hand, when (2) control resource securing setting is selected, it is allocated to the fixed cycle task 80. When any of them is selected and then an OK button 276 is selected, the setting for the input data which is a target is updated, and then the user interface screen returns to the user interface screen 250 shown in FIG. 12.

In this manner, the input data (variables) allocated to any of tasks which are executed in a plurality of different cycles can be arbitrarily set by a user in accordance with a monitoring target or the like. That is, in a case where the data collection process 162 (a second data collection process) and the corresponding feature extraction process 164 (a second data processing process) can be allocated to both the primary fixed cycle task 70 and the fixed cycle task 80, the support device 200 accepts a setting of which task these processes are allocated to.

Referring back to FIG. 12, the user interface screen 250 has an apply button 262, and the apply button 262 is selected, so that it is determined which task the input data processing 50 for each piece of input data is allocated to on the basis of a relationship between the input data referred to by the process allocated to each task and the input data which is set as a target of the input data processing 50.

In this case, content which is set on the user interface screen 270 shown in FIG. 13 is preferentially reflected. A user is notified of the allocation result.

Figure 14:
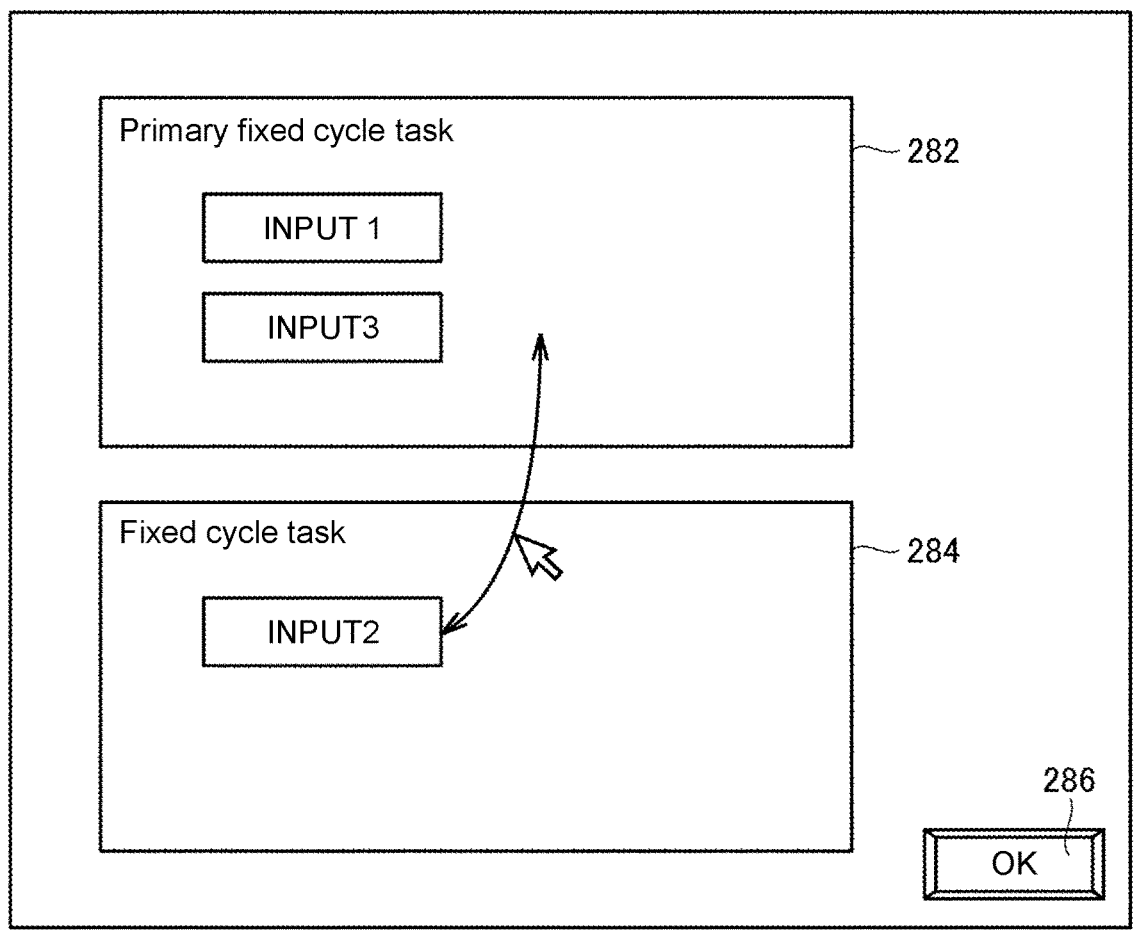
FIG. 14 is a diagram illustrating an example of a user interface screen in a case where an apply button on the user interface screen of FIG. 12 is selected.

FIG. 14 is a diagram illustrating an example of a user interface screen 280 in a case where the apply button 262 of the user interface screen 250 of FIG. 12 is selected. The user interface screen 280 shown in FIG. 14 includes a primary fixed cycle task field 282 that displays input data allocated to the primary fixed cycle task 70 and a fixed cycle task field 284 that displays input data allocated to the fixed cycle task 80.

Input data allocated to each task is visually displayed in the primary fixed cycle task field 282 and the fixed cycle task field 284. Further, a user can change a task which is an allocation destination for each piece of input data through an easy operation. For example, it is possible to change a task which is an allocation destination for each piece of input data through a user's drag operation.

That is, the support device 200 accepts a change in the allocation destination task of the data collection process 162 (the second data collection process) and the corresponding feature extraction process 164 (the second data processing process).

Finally, a task which is an allocation destination for each piece of input data is determined by a user selecting an OK button 286.

I. Modification Example

In the above description, the feature extraction process 164 used for the abnormality monitoring process has been illustrated as an example of the data processing process, but the content of the data processing process is not limited thereto.

For example, another example of the data processing process is a unit conversion process. The status value acquired from a field by the field device group 10 is sometimes held as a status value standardized in a predetermined range (for example, 0 to 1023 digits) due to the processing characteristics of an analog/digital converter or the like. In many cases, it is preferable to convert the value standardized in such a predetermined range into the physical quantity (such as, for example, temperature, rotational speed, or flow velocity) of an actual field before processing.

Consequently, the unit conversion process may include a process of converting the status value (input data) managed by the control device 100 into an actual physical quantity of a field and then providing it to an internal process or an external device. In this manner, the data processing process may include a process of converting the input data collected through the data collection process 162 into a corresponding physical quantity.

In addition, another example of the data processing process is preprocessing of data transfer or the like. For example, assuming that the control device 100 is used as the gateway of the Internet of Things (IoT), it is necessary to transmit information specified in a data format adapted to the data exchange partner. In such a case, it is necessary to form the status value (input data) managed by the control device 100 in accordance with a predetermined format before sending out. In this manner, as an example of the data processing process, a data forming process may be included.

As a specific example of the data forming process, a process of sequentially arranging information determined in advance in an order determined in advance is assumed. In this manner, the data processing process may include a process of forming one or a plurality of pieces of input data collected through the data collection process 162 into a predetermined format.

J. Addition

The present embodiment as described above includes the following technical ideas.

[Configuration 1]

A control system including:
a control device (100) that executes a control arithmetic for controlling a control target; and
a support device (200) that sets content of the control arithmetic which is executed by the control device,
wherein the control device includes a first arithmetic unit (1021) for cyclically executing a first task (70) to which one or a plurality of processes is allocated in a first control cycle (71) and a second arithmetic unit (1022) for cyclically executing a second task (80) to which one or a plurality of processes is allocated in a second control cycle (81) that is longer than the first control cycle,
the control arithmetic includes a data collection process (162) of collecting input data that is capable of being referred to by the control device and a data processing process (164) of processing the collected input data to generate new data,
a first data collection process with first input data as a target and a corresponding first data processing process are allocated to the first task, and
a second data collection process with second input data as a target and a corresponding second data processing process are allocated to either of the first task and the second task in accordance with a setting via the support device.

[Configuration 2]

The control system according to configuration 1, wherein the control device further includes a third arithmetic unit (1023) for executing a third task (90) to which one or a plurality of processes is allocated depending on a situation.

[Configuration 3]

The control system according to configuration 2, wherein a process (92) of storing data which is generated through the first data processing process and the second data processing process is allocated to the third task.

[Configuration 4]

The control system according to configuration 2 or 3, wherein a process (94) of calculating a predetermined index from data which is generated through the first data processing process and the second data processing process is allocated to the third task.

[Configuration 5]

The control system according to any one of configurations 1 to 4, wherein the data processing process includes a process (164) of calculating a feature amount from a plurality of pieces of input data collected through the data collection process.

[Configuration 6]

The control system according to any one of configurations 1 to 5, wherein the data processing process includes a process of converting the input data collected through the data collection process into a corresponding physical quantity.

[Configuration 7]

The control system according to any one of configurations 1 to 6, wherein the data processing process includes a process of forming one or a plurality of pieces of input data collected through the data collection process into a predetermined format.

[Configuration 8]

The control system according to any one of configurations 1 to 7, wherein, in a case where the second data collection process and the second data processing process are capable of being allocated to both the first task and the second task, the support device accepts (270) a setting of which task these processes are allocated to.

[Configuration 9]

The control system according to configuration 8, wherein the support device accepts (280) a change in an allocation destination task of the second data collection process and the second data processing process.

[Configuration 10]

A control device (100) that executes a control arithmetic for controlling a control target, including:
a first arithmetic unit (1021) for cyclically executing a first task (70) to which one or a plurality of processes is allocated in a first control cycle (71); and
a second arithmetic unit (1022) for cyclically executing a second task (80) to which one or a plurality of processes is allocated in a second control cycle (81) that is longer than the first control cycle,
wherein the control arithmetic includes a data collection process (162) of collecting input data that is capable of being referred to by the control device and a data processing process (164) of processing the collected input data to generate new data,
a first data collection process with first input data as a target and a corresponding first data processing process are allocated to the first task, and
a second data collection process with second input data as a target and a corresponding second data processing process are allocated to either of the first task and the second task in accordance with an external setting.

K. Advantage

According to the control system of the present embodiment, the data collection process 162 and the feature extraction process 164 (the data processing process) can be independently allocated to both the primary fixed cycle task 70 and the fixed cycle task 80 which are cyclically executed, and thus it is possible to realize efficient processing by allocating these processes to a more appropriate task in accordance with processing performance required for input data to be processed, the attribute of the input data, or the like.

In addition, according to the control system of the present embodiment, in a case where the above processes can be allocated to both the primary fixed cycle task 70 and the fixed cycle task 80, a user interface for notifying a user to that effect is prepared, and thus it is possible to prevent the data collection process 162 and the corresponding feature extraction process 164 (the data processing process) from being erroneously allocated to a different task.

It is noted that the embodiment disclosed herein is merely illustrative in all aspects and should not be recognized as being restrictive. The scope of the present invention is defined by the scope of claims rather than the description of the embodiment stated above, and is intended to include meanings equivalent to the scope of claims and all modifications within the scope.

The invention claimed is:

1. A control system comprising:
a control device, comprising a processor having a plurality of cores, that executes a control arithmetic for controlling a control target; and
a support device that sets content of the control arithmetic which is executed by the control device,
wherein the control device includes a first core of the processor for cyclically executing a first task to which one or a plurality of processes is allocated in a first control cycle and a second core of the processor for cyclically executing a second task to which one or a plurality of processes is allocated in a second control cycle that is longer than the first control cycle,
the control arithmetic includes a data collection process of collecting input data that is capable of being referred to by the control device and a data processing process of processing the collected input data to generate new data,
a first data collection process with first input data as a target and a corresponding first data processing process are allocated to the first task, and
a second data collection process with second input data as a target and a corresponding second data processing process are allocated to either of the first task and the second task in accordance with a setting via the support device.

2. The control system according to claim 1, wherein the control device further includes a third core of the processor for executing a third task to which one or a plurality of processes is allocated depending on a situation.

3. The control system according to claim 2, wherein a process of storing data which is generated through the first data processing process and the second data processing process is allocated to the third task.

4. The control system according to claim 3, wherein a process of calculating a predetermined index from data which is generated through the first data processing process and the second data processing process is allocated to the third task.

5. The control system according to claim 2, wherein a process of calculating a predetermined index from data which is generated through the first data processing process and the second data processing process is allocated to the third task.

6. The control system according to claim 1, wherein the data processing process includes a process of calculating a feature amount from a plurality of pieces of input data collected through the data collection process.

7. The control system according to claim 1, wherein the data processing process includes a process of converting the input data collected through the data collection process into a corresponding physical quantity.

8. The control system according to claim 1, wherein the data processing process includes a process of forming one or a plurality of pieces of input data collected through the data collection process into a predetermined format.

9. The control system according to claim 1, wherein, in a case where the second data collection process and the second data processing process are capable of being allocated to both the first task and the second task, the support device accepts a setting of which task these processes are allocated to.

10. The control system according to claim 9, wherein the support device accepts a change in an allocation destination task of the second data collection process and the second data processing process.

11. A control device, comprising a processor having a plurality of cores, that executes a control arithmetic for controlling a control target, comprising:
a first core of the processor for cyclically executing a first task to which one or a plurality of processes is allocated in a first control cycle; and
a second core of the processor for cyclically executing a second task to which one or a plurality of processes is allocated in a second control cycle that is longer than the first control cycle,
wherein the control arithmetic includes a data collection process of collecting input data that is capable of being referred to by the control device and a data processing process of processing the collected input data to generate new data,
a first data collection process with first input data as a target and a corresponding first data processing process are allocated to the first task, and
a second data collection process with second input data as a target and a corresponding second data processing process are allocated to either of the first task and the second task in accordance with an external setting.

* * * * *